(12) United States Patent
Kravitz et al.

(10) Patent No.: US 6,738,905 B1
(45) Date of Patent: May 18, 2004

(54) CONDITIONAL ACCESS VIA SECURE LOGGING WITH SIMPLIFIED KEY MANAGEMENT

(75) Inventors: David W. Kravitz, Fairfax, VA (US); David M. Goldschlag, Silver Spring, MD (US)

(73) Assignee: Digital Video Express, L.P., Herndon, VA (US)

( * ) Notice: Subject to any disclaimer, the term of this patent is extended or adjusted under 35 U.S.C. 154(b) by 0 days.

(21) Appl. No.: 09/291,052

(22) Filed: Apr. 14, 1999

Related U.S. Application Data (60) Provisional application No. 60/081,739, filed on Apr. 15, 1998.

(51) Int. Cl.[7] ............................. H04L 9/00; G06F 11/30
(52) U.S. Cl. ........................ 713/194; 713/193; 380/201
(58) Field of Search ..................... 713/193–194, 713/182; 380/201–202, 270, 278; 705/51, 52, 57

(56) References Cited

U.S. PATENT DOCUMENTS

| | | | |
|---|---|---|---|
| 4,528,589 A | | 7/1985 | Block et al. |
| 4,768,087 A | | 8/1988 | Taub et al. |
| 4,796,181 A | * | 1/1989 | Wiedemer .................... 705/52 |
| 4,827,508 A | | 5/1989 | Shear |
| 4,905,280 A | * | 2/1990 | Wiedemer .................... 463/40 |
| 4,907,273 A | * | 3/1990 | Wiedemer .................. 380/230 |
| 4,908,834 A | * | 3/1990 | Wiedemer .................. 380/228 |
| 4,937,866 A | | 6/1990 | Crowther et al. |
| 4,945,563 A | | 7/1990 | Horton et al. |
| 4,947,428 A | * | 8/1990 | Guillou et al. ............... 380/240 |
| 4,980,912 A | * | 12/1990 | Welmer ....................... 380/232 |
| 5,010,571 A | | 4/1991 | Katznelson |
| 5,029,207 A | | 7/1991 | Gammie |
| 5,081,680 A | | 1/1992 | Bennett |

(List continued on next page.)

OTHER PUBLICATIONS

*Proposal for a Conditional Access System for Terrestrial Broadcast*, Canal Plus/SECA, Aug. 20, 1998.

Primary Examiner—Thomas R. Peeso
Assistant Examiner—Kambiz Zand
(74) Attorney, Agent, or Firm—McDermott, Will & Emery

(57) ABSTRACT

A method and apparatus for distributing content data from a content provider to a subscriber. The method includes encrypting content data by the content provider and providing the content data from the content provider to a broadcaster. The content provider also provides a content descriptor, including keys to decrypt the encrypted content, to a conditional access provider. The broadcaster distributes the encrypted content information to a subscriber. A business service provider negotiates with the subscriber to deliver individual content programs or packages of content programs to the subscriber for a fee. The conditional access provider distributes a content descriptor including keys necessary to decrypt the programs the subscriber selected from the business service provider. A CAM retained by the subscriber maintains a log of programs accessed, and uploads the log to the business service provider, which is used to determine the appropriate fee which the subscriber should be charged. Alternatively, the subscriber may purchase a package plan which does not require logging, and thus allows unidirectional communication.

26 Claims, 9 Drawing Sheets

U.S. PATENT DOCUMENTS

| | | | |
|---|---|---|---|
| 5,144,664 A | * | 9/1992 | Esserman et al. ............ 380/228 |
| 5,289,271 A | | 2/1994 | Watson |
| 5,388,211 A | | 2/1995 | Hornbuckle |
| 5,499,298 A | * | 3/1996 | narasimhalu et al. ......... 705/54 |
| 5,509,070 A | * | 4/1996 | Schull .......................... 705/54 |
| 5,671,276 A | | 9/1997 | Eyer et al. |
| 5,701,152 A | | 12/1997 | Chen |
| 5,703,951 A | | 12/1997 | Dolphin |
| 5,740,246 A | | 4/1998 | Saito |
| 5,825,883 A | | 10/1998 | Archibald et al. |
| 5,991,399 A | * | 11/1999 | Graunke et al. ............. 380/279 |
| 6,069,647 A | * | 5/2000 | Sullivan et al. ................ 725/29 |
| 6,073,122 A | * | 6/2000 | Wool ........................... 380/201 |
| 6,081,600 A | * | 6/2000 | Blanchard et al. ........... 380/255 |
| 6,100,916 A | * | 8/2000 | August et al. ............... 380/202 |
| 6,141,754 A | * | 10/2000 | Choy .......................... 713/200 |
| 6,182,218 B1 | * | 1/2001 | Saito .......................... 713/176 |
| 6,249,873 B1 | * | 6/2001 | Richard et al. ............. 713/200 |
| 6,282,293 B1 | * | 8/2001 | Itoh et al. ................... 380/201 |
| 6,314,409 B2 | * | 11/2001 | Schneck et al. ............ 713/182 |

* cited by examiner

| ECM$_{1,1}$() | ECM$_{1,2}$() | ECM$_{1,3}$() | e$_1$(p$_1$) | e$_1$(p$_2$) | e$_1$(p$_3$) | ECM$_{2,1}$() | ECM$_{2,2}$() | ECM$_{2,3}$() | e$_2$(p$_4$) | e$_2$(p$_5$) | e$_2$(p$_6$) | ⋯ |

FIG. 8B

| Index$_1$ | e$_1$(p$_1$) | e$_1$(p$_2$) | e$_1$(p$_3$) | Index$_2$ | e$_2$(p$_4$) | e$_2$(p$_5$) | e$_2$(p$_6$) | ⋯ |

CONDITIONAL ACCESS VIA SECURE LOGGING WITH SIMPLIFIED KEY MANAGEMENT

This application claims benefit of Provisional application Serial No. 60/081,739 filed Apr. 15, 1998.

FIELD OF THE INVENTION

The present invention pertains to a method and apparatus for allowing a subscriber to access information from several information providers, usually for a fee. More particularly, the present invention pertains to a method and apparatus for allowing a subscriber to obtain access to individual programs where the subscriber is only charged for the programs which have been accessed. The present invention also pertains to a method and apparatus for allowing a subscriber to obtain access to a package of programs in a uni-directional communication with the program service provider.

BACKGROUND OF THE INVENTION

Some types of information broadcast systems are commonly known. One type is an over the air broadcast by use of UHF and VHF signals which can be freely obtained by anyone who can pick up such signals with an appropriate antenna. These systems generate revenue by selling airtime for commercial broadcasts. A second type of system is subscription system where a subscriber subscribes to the broadcast system which is provided, for example, through a cable line or a satellite dish.

The subscription systems protect the content of the information in the broadcast from being read by non subscribing cable or satellite dish users by complex encryption schemes. Such schemes often use a new encryption method for every discrete period of time within the broadcast, i.e. every 3 seconds. These schemes also commonly require the subscriber to have a conditional access module (CAM) which receives and decrypts the encrypted content data. In order for the CAM to decrypt the information, ECMs (Entitlement Control Messages) are interleaved with data packets containing the content information which instruct the CAM how to decrypt the content information. However, in typical subscription broadcast systems, the subscriber is only able to subscribe to one information provider, i.e. they are single subscription systems. Generally, the CAM of one information provider will not be able to interpret the ECMs of another information provider. This limits the subscriber's ability to freely choose programs since the subscriber is only able to receive the programs offered by one particular information provider.

One solution is for the subscriber to subscribe to several different information providers. This would require the subscriber to have a CAM for each provider and to be charged separately by each provider. Additionally, a subscriber may have access to several information providers in his/her geographic region, such as, several local broadcast service providers and cable service providers. Clearly, this is an expensive and highly undesirable choice.

Another solution is known as SIMULCRYPT, in which the ECMs of a plurality of information providers are interleaved throughout the content of the broadcast. This allows different service providers to use the same content information, thus sharing their resources. However, SIMULCRYPT does not provide the subscribers any more flexibility since the CAM of the subscriber can only interpret one of the ECMs, i.e. only the ECM of their information provider. Another problem of SIMULCRYPT is that it involves a high degree of cooperation between competing broadcasters, such as requiring competing broadcasters to provide confidential ECM information to be broadcast on the broadcast mechanisms.

Furthermore, the advent of HDTV (high definition TV) will likely enable traditional air broadcast information providers to provide subscription air broadcasts, since digital data in the broadcast could easily be encrypted using known techniques. A single broadcaster is expected to be able to allocate their HDTV broadcast channel (provided to the broadcasters by the Federal Communications Commission (FCC)) into as many as four, or more, air broadcast channels. Additionally, many of those channels may be encrypted for subscription channels, i.e. up to three of the HDTV channels. Since there are often at least four television networks which broadcast in single geographic area, the number of subscription information providers available to a single subscriber will greatly increase if each of the networks provides a plurality of subscription channels. This is even a greater problem for a subscriber who lives on a border between two geographic broadcast areas, such as between Baltimore and Washington D.C., and thus would potentially have to deal with twice as many subscription channels from twice as many information providers. It would be very inconvenient for a subscriber to subscribe to each of these subscription channels since the subscriber would need to have several different CAMs to decrypt the several different channels, and the subscriber would have to pay each of the several different information providers.

One possible solution is for the networks to closely cooperate with each other, trading ECMs and encryption equipment. Thus, the CAM provided by one network, for example ABC, would be able to decrypt the content information provided by other networks, and ABC could collect the subscription fee from the subscriber and redistribute the appropriate amounts to the other networks. However, such a solution appears to require a very high degree of cooperation and trust, neither of which are likely to exist in the competitive broadcast industry. For example, if the security of another network, such as NBC, was compromised, ABC would have little incentive to repair any ABC CAMs to correct the security breach affecting NBC. Additionally, the degree of cooperation would multiply to provide subscribers on a border of adjacent broadcast areas with the same service.

A proposed solution for obtaining access to encrypted broadcast data is disclosed in U.S. Pat. No. 5,010,571 to Katznelson. Katznelson disclose a process for obtaining access to encrypted information stored on a disc by using an authorization and key distribution terminal (service provider) to send the decryption keys to the customer, after the customer has requested such keys in a customer initiated communication. However, in this proposed solution, the customer must contact the service provider prior to accessing any discs (information), thus offline operations and/or a unidirectional operations are not possible. Additionally, it may be a great inconvenience to the customer to request access every time it is desired, since such request would take additional time and effort by the customer, both of which may be significant depending on the speed and availability of connection to the service provider.

Another approach to obtaining access to encrypted broadcasted information is proposed in U.S. Pat. No. 5,703,951 to Dolphin. Dolphin discloses a procedure wherein a disc (CD-ROM) containing a plurality of encrypted magazines is distributed to customers, who are able to access the individual magazines to which they have a corresponding key stored on a PCMCIA card. If the customer does not have the corresponding key on their PCMCIA card, then they can contact a service provider for such key. However, this proposal is per publisher based; that is, there is no procedure for providing the customer access to magazines published by several different publishers. In fact, the only way that the user could get magazines from other publishers is to have competing publishers share confidential encryption information, and share billing receipts with each other. This is an undesirable business procedure, since a publisher will not be able to truly compete with its competitors. Another related drawback of this proposal is that the customer has very limited flexibility in choosing which magazines to access, since the customer is limited to the particular magazines which happen to be stored on the CD-ROM distributed by the publisher.

SUMMARY AND OBJECTS OF THE INVENTION

It is an object of the invention to provide subscribers with a cost effective method for providing a plurality of subscription services in a geographic area.

It is another object of the invention to provide subscribers at the borders of adjacent broadcast areas with a cost effective method of obtaining plurality of subscription services.

It is yet another object of the invention to allow a user to choose to receive a package of content from a service provider, or to receive individual programs of content from the service provider.

It is yet another object of the invention to allow a subscriber to receive content data through an off-line operation.

It is yet another object of the invention to allow a subscriber to receive content data through a unidirectional communication with a service provider.

To achieve the foregoing and other objects and in accordance with the purpose of the present invention, as embodied and broadly described herein, the method of this invention may comprise a method of distributing content data from a content provider device to a subscriber, the content provider including an encryption device, the subscriber having a set top box including a decryption device, the method comprising the steps of: encrypting content using the encryption device; distributing the encrypted content with content identifiers from the content provider to the subscriber; distributing keys for decrypting the encrypted content from the content provider to a service provider; distributing the keys from the service provider to the subscriber; and accessing the content by decrypting the content using the decryption device.

In a further aspect of the present invention, in accordance with its objects and purposes, the method hereof may also preferably comprise the steps of: logging access of the content by the subscriber in a log contained on a non-volatile memory; and sending the log to the service provider.

In yet a further aspect of the present invention, in accordance with its objects and purposes, the method hereof may further preferably include distributing rules with the keys, wherein the steps of accessing the content and logging access of the content are performed according to the rules.

In yet a further aspect of the present invention, the step of distributing the keys may further preferably include distributing the keys by broadcasting the keys to the subscriber.

In yet a further aspect of the present invention, the step of distributing the encrypted content may further preferably be performed by multiple content providers, and the step of distributing keys is performed by multiple service providers, and wherein the subscriber interacts with at least one of said multiple content providers and at least one of said multiple service providers.

In yet a further aspect of the present invention, the step of distributing the keys may further preferably include distributing encrypted content from a single content provider to a plurality of broadcasters; and broadcasting the encrypted content to the subscriber.

In yet a further aspect of the present invention, wherein the set top box may further preferably include a display device and a menu navigation device, and may further preferably comprise the steps of: displaying a menu on said display device; receiving input from said menu navigation device; and controlling access to content based on the received input.

Another method according to the present invention may comprise a method of distributing content data from a content provider to a subscriber, the subscriber having a set top box including a decryption device, the method comprising the steps of: encrypting the content data using a content key and an index, in a series of indices, corresponding to a content packet, in a series of content packets; forming a data stream by interleaving the series of indices with a series of content packets; transmitting the data stream to the set top box; and decrypting the content packet using a content key and the index corresponding to the content packet in a series of indices.

In a further aspect of the present invention, in accordance with its objects and purposes, the other method hereof may also preferably comprise encrypting and decrypting by hashing the indices with the content key.

An apparatus according to the present invention may comprise an apparatus for receiving and decrypting encrypted content data from a content provider to a subscriber via a broadcaster, using a content descriptor provided by a service provider, the apparatus comprising: a receiver for receiving the encrypted content; a decryptor for decrypting the encrypted content using the content descriptor; and a controller for controlling the decryptor and for communicating with the service provider, thereby providing the subscriber access to the content data.

In a further aspect of the present invention, in accordance with its objects and purposes, the apparatus hereof may also preferably comprise, a logging device for logging access to the content data, wherein the controller controls the logging device log access to the content data according to rules contained in the content descriptor.

In yet a further aspect of the present invention, in accordance with its objects and purposes, the apparatus hereof may also preferably comprise communication control logic, the communication control logic being responsive to the controller to communicate with the service provider.

In a further aspect of the present invention, in accordance with its objects and purposes, the apparatus hereof may also preferably comprise a menu generator for generating a menu, having a plurality of operations, to be displayed on a display device; and a menu navigator for providing a user selection of said operations to said controller.

The invention is advantageous over the SIMULCRYPT because it provides the conditional access control to a subscriber through a different channel than the content, thus broadcaster can maximize its business by disseminating the broadcast to as many people as possible without investing resources to protect the content of the broadcast.

Furthermore, the broadcaster is no longer required to allocate space on the broadcast transmission for transmitting conditional access control data such as keys to decrypt the content data. Additionally, unlike SIMULCRYPT, the present invention does not require significant cooperation between competing broadcasters or competing content providers, and thus does not require them to share confidential conditional access information or subscription fees.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate several embodiments of the present invention and, together with the description, serve to explain the principles of the invention. In the drawings.

DETAILED DESCRIPTION OF THE INVENTION

Reference will now be made in detail to the present preferred embodiments of the invention, examples of which are illustrated in the accompanying drawings.

Figure 1:
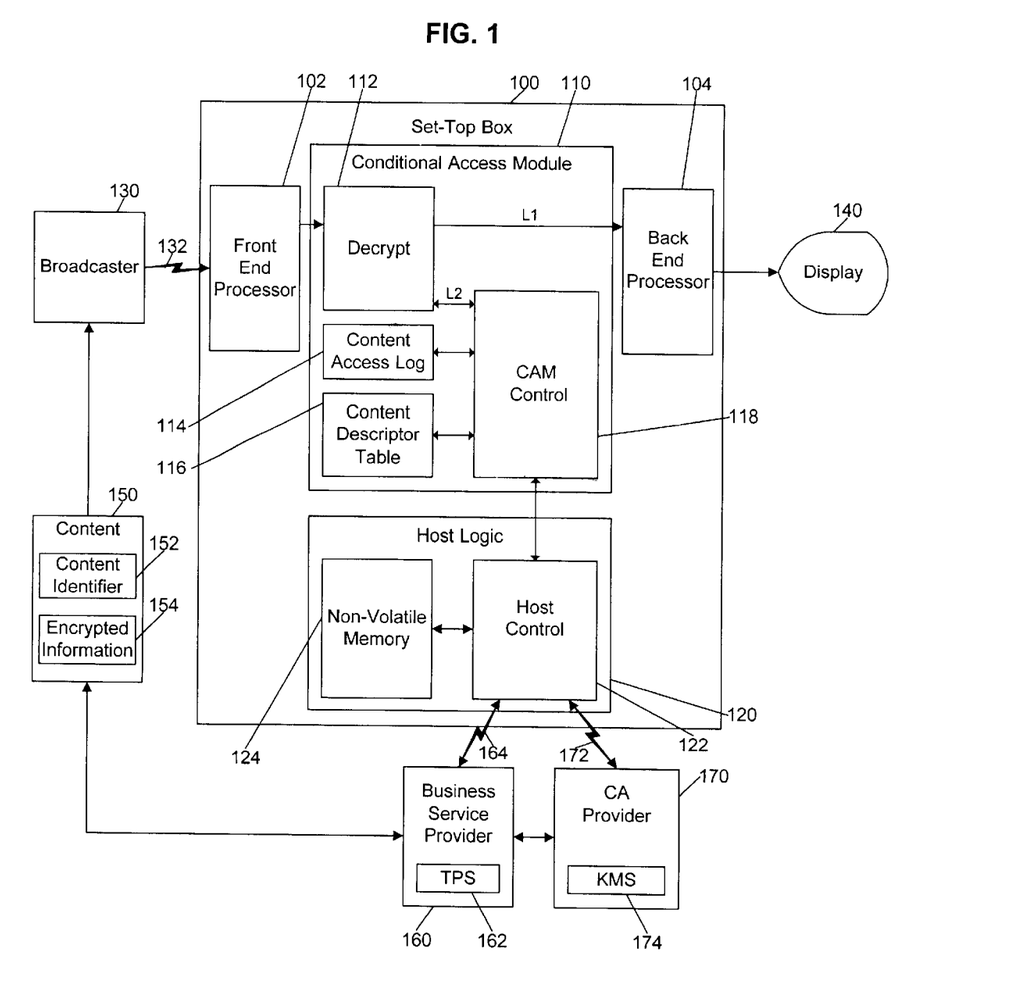
FIG. 1, illustrates a schematic diagram of the present invention.

FIG. 1 illustrates a first embodiment of the invention. This embodiment of the invention comprises five basic components which interact with each other. The content provider 150 generates content, such as movies, adds content identifier (CI) data using a content identifier device 152, and encrypts the content information using an encryption device 154. The content provider 150 also generates keys to decrypt the encrypted content. A broadcaster 130 broadcasts the encrypted content with the CI data to the subscriber, who receives the content and decrypts it via a set top box 100. The content provider 150 also provides a business service provider 160 with appropriate keys to decrypt of a plurality of programs generated by the content provider 150. The business service provider 160 interacts with the subscriber to determine what programs the subscriber would like to access, i.e. subscribe to, and provides the corresponding keys to a conditional access (CA) provider 170. The CA provider 170 installs, or otherwise provides, a conditional access module (CAM) 110 in (or for) the set top box 100 of the subscriber, and provides keys to the subscriber which allows the subscriber to decrypt specific programs of content data. The CAM 110 receives the keys from the CA provider 170, and allows the set top box 100 to obtain access to receive content (i.e. decrypt the content) whose CI data corresponds to the keys received from the CA provider 170.

The set top box 100 is typically located in the home of the subscriber and is used in conjunction with a display device 140, e.g. a television set. The set top box 100 includes a front end processor 102 which receives broadcast information from a broadcaster 130 by conventional receiving techniques. The information may be transmitted from the broadcaster 130 by conventional air broadcast transmission, by cable transmission, by satellite transmission, by supply of recorded media (such as ROMs, disks or tapes), by internet transmission, or by any other type of transmission. The front end processor 102 sends the received signal to a CAM 110 which decrypts the content data contained in the signal using a decryption device 112, and forwards the decrypted content data to a backend processor 104 over signal line L1. The backend processor 104 converts the decrypted content data into a form which may be displayed on the display device 140. Preferably, the back end processor 104 is a MPEG processor.

The decryption device 112 may be a conventional decryption device as readily understood by those of ordinary skill in the art. The decryption device 112 receives the broadcast signal containing the content data and the CI data, and forwards the CI data to a CAM control device 118 over a bidirectional signal line L2. The CAM control device 118 accesses a content descriptor table 116 to determine if the subscriber is authorized to decrypt the content data. Specifically, the content descriptor table 116 contains a list of content descriptors (CDs) which contains unique information for particular program of content which can be used by the CAM control device 118 to determine the decryption key, the title, and any rules governing access to and logging of the content. The presence of the CD in the content descriptor table 118 is positive authorization implicitly granting the subscriber access to the content. This positive authorization may be constrained by explicit negative authorizations in the rule: for example, time windows during which the content may be accessed. The CAM control device 118 provides such authorization or negative authorization to the decryption device 112 over the bi-directional signal line L2. When authorization is given from the CAM control device 118 to decrypt the content data, a content access log 114 logs the access to the content. The content access log 114 is preferably a non-volatile memory.

A host logic 120 controls the communication between the CAM control device 118 and the business service provider 160, and between the CAM control device 118 and the CA provider 170. Specifically, the host logic 120 contains host control logic 122 which controls a communication device (not shown), such as a modem, a DSL, or a parallel link, through which the CAM control device 118 interacts with the business service provider 160 to allow the subscriber to select which programs the subscriber desires to access via subscription. The business service provider 160 contains a transaction processing system (TPS) 162, which preferably uploads the log of accessed content stored in the. content access log 114. An example of a TPS system which may be used as TPS 162 in conjunction with the present invention is described in commonly assigned U.S. patent application Ser. No. 09/092,177 to Oren et al., filed on Jul. 24, 1998. The business service provider 160 may use the log of accessed content to bill the subscriber, to determine the programs, or type of programs desired by their subscribers, etc. The business service provider may also use the log to determine how the subscription fee, paid by the subscriber, should be distributed among a plurality of content providers in the form of royalties. The business service provider 160 also provides the selected program information to the CA provider 170.

The CA provider 170 contains a key management system 174 which contains a plurality of keys associated with the plurality of programs offered by the content provider 150. The CA provider 170 securely provides the appropriate keys to the CAM control device 118, which in turn provides the keys to the decryption device 112 to decrypt the content of the desired program. The CA provider 170 also preferably provides new keys to the host control device 122 when the content provider 150 changes the keys. Typically the are supplied to the CA provider 170 by the content provider 150 prior to such further distribution.

The host logic also contains a non-volatile memory 124 which, may for example contain billing information, such as a particular billing plan; communication information which, may for example instruct the host control 122 to initiate a communication with either the business service provider 160 or the CA provider 170; or other information as will be discussed later.

Figure 2:
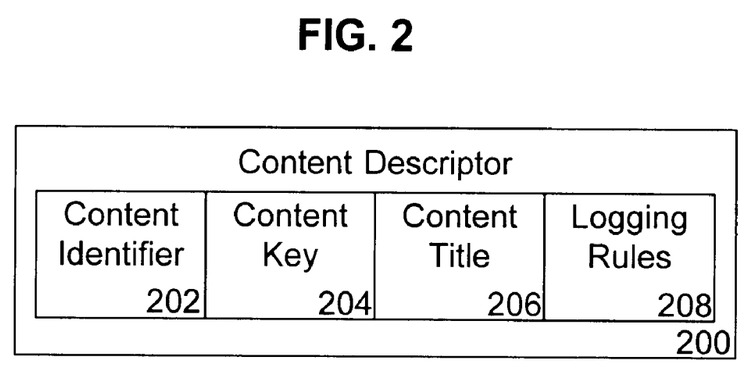
FIG. 2, illustrates the content of the content descriptor.

The CI data is unique to each program of content which particularly identifies the particular program of content. The content identifier may be as simple as an index into a table of content descriptors (CDs). As shown in FIG. 2, a CD 200 preferably contains a content identifier (CI) 202, a content key 204, content title 206, and logging rules 208. The logging rules 208 may include such information as a release date, which prevents access to the content data until such release date, or a particular billing method which should be used for the accessed content. The logging rules 208 may be established by the content provider 150 or the business service provider 160.

The CAM 110 preferably securely logs access to content rather than charging for the right to access the content. The amount of information contained in a logging operation may be controlled by parameters in the CAM control device 118 and in the CD logging rules 208. The parameters may include the number of bytes of content received, the time of receiving the content, or a particular usage code contained in the CD. Additionally, content logging may involve two stages: an initial entry which logs the overall access to the content (e.g., who is accessing what), and subsequent entries which further describe the access to the content (e.g., what part of the content is accessed, how much, and when).

The CAM control device 118 securely and periodically sends the secure log to the CA provider 170, who in turn may pass it along to the business service provider 160. Alternatively, the CAM control device 118 may securely and periodically send the secure log directly to the business service provider 160. The content access log 114 preferably can only be cleared after the CAM control device 118 receives a positive acknowledgment that the log has been successfully transferred.

The embodiment is FIG. 1 has been described above as containing five basic components which interact with each other. This was done to illustrate the operation of the invention, and is not intended to constraint the specific structure of the invention. It will be clear to the ordinary artisan that several of the components may be combined into one entity or considered as further broken down into discrete entities. For example, the business service provider 160 and the CA provider 170 may be joined as a single entity called a service provider. Additionally, the content provider 150 may be joined with the broadcaster 130 as a single entity. Different aspects of the set top box 100 may be further broken down into and considered as discrete components. Any other combinations that do not significantly alter the operation of the invention will be readily apparent to those of skill in the art to be encompassed by the present invention.

Additionally, the embodiment described in FIG. 1 illustrates one broadcaster 130 and one content provider 150. This was done to simplify the illustration of the operation of the invention, and is not intended to place constraints on the specific structure of the invention. Particularly, a single content provider 150 may distribute content to a plurality of broadcasters, distribute conditional access information to a plurality of CA providers and receive royalties from a plurality of business service providers, which may be considered to be collectively represented by broadcaster 130, CA provider 170, and business service provider 160 respectively. Furthermore, a single broadcaster may receive and broadcast content from a plurality of content providers, which may be considered to be collectively represented by content provider 150. Additionally, a single business service provider and/or CA provider may receive conditional access information from a plurality of content providers, which may be considered to be collectively represented by content provider 150. Additional component combinations and separations will suggest themselves to the artisan.

Figure 3:
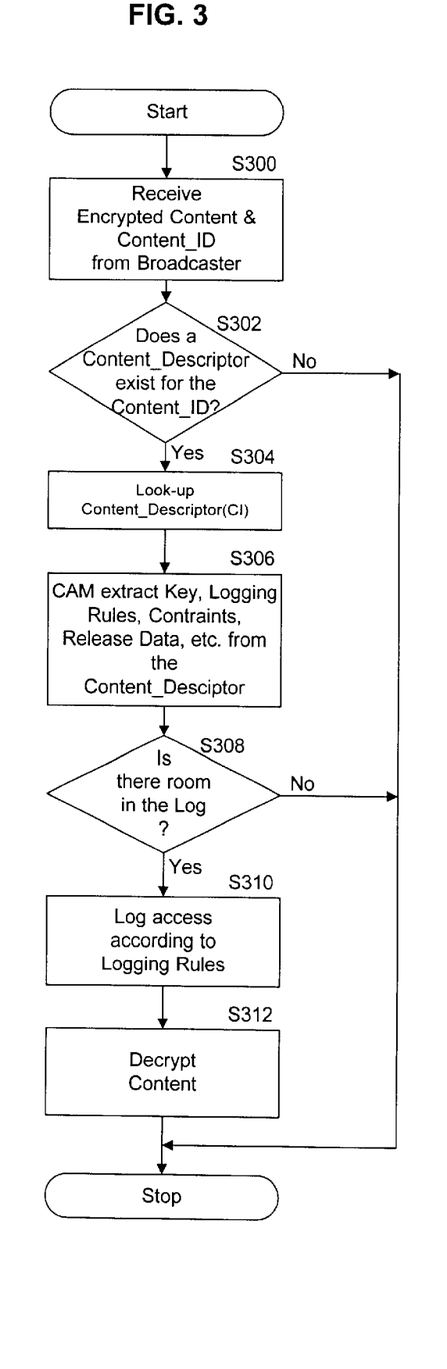
FIG. 3, illustrates a logical flow of the operation of the invention.

The operation of the CAM 110 is illustrated in FIG. 3. As shown in step S300, the CAM 110 receives encrypted content and CI data from the broadcaster 130 through the front end processor 102. The CAM control device 118 accesses the content descriptor table 116 to determine if a CD exists for the CI data (S302). If a CD does not exist for the CI data, then access is denied and the process stops. If a CD does exist for the CI data, then the CAM control device 118 accesses the CD corresponding to the CI data (S304) and extracts the key and any logging rules that may exist (S306). Next, the CAM control device 118 determines if there is enough memory space in the content access log device 114 to log the access of the content information (S308). If there is not enough space, then access is denied and the process stops. If there is enough space, then the access of the content is logged if the logging rules permit access (S310), and the content is decrypted (S312) by the decryption device 112.

Figure 4:
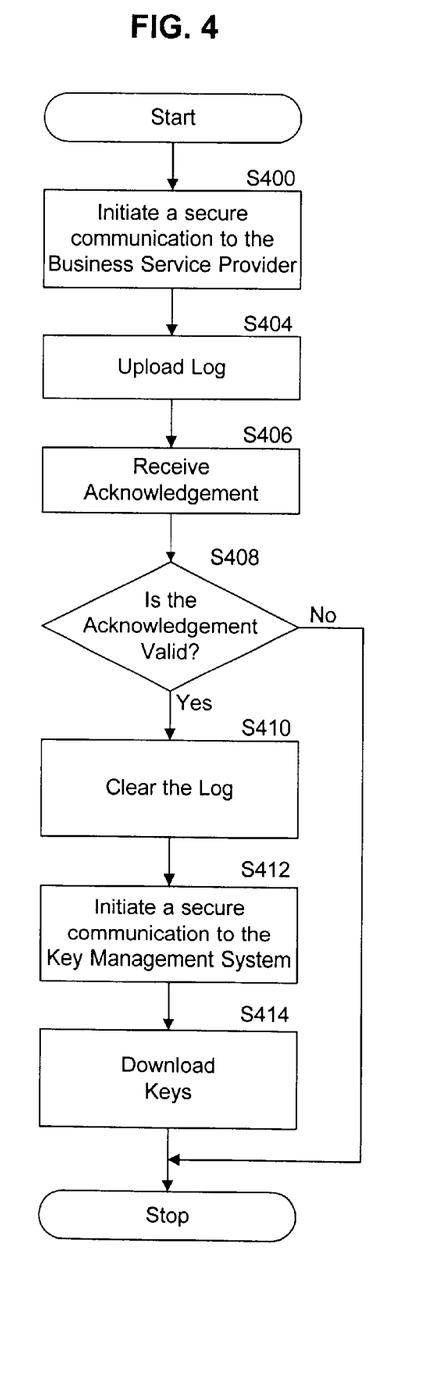
FIG. 4, illustrates a logical flow for communicating with the business service provider and the CA provider.
Figure 5:
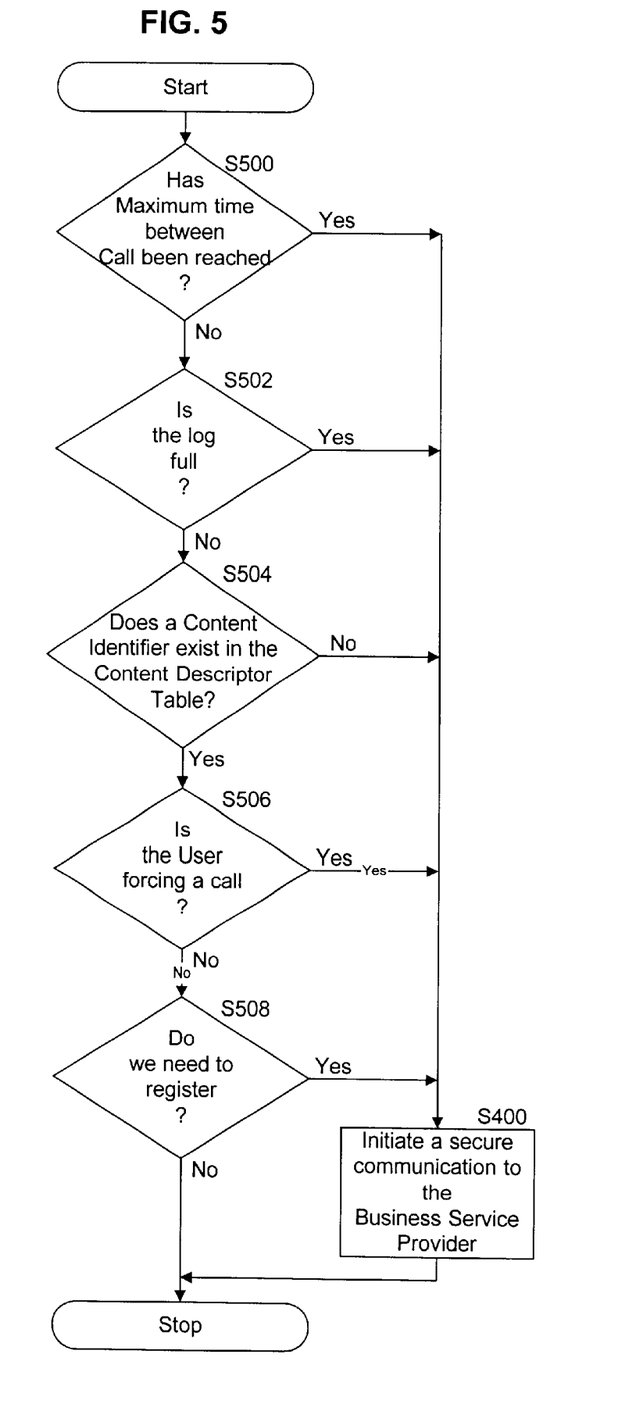
FIG. 5, illustrates a conditions for triggering a communication.

For security purposes, the set top box 100 preferably periodically (or non-periodically but from time to time) contacts the business service provider 160 and the CA provider 170 or is contacted by those providers. where the set top box initiates communication, this communication preferably follows the protocol illustrated in FIG. 4. The communication may be initiated after any of the determinations made in FIG. 5. Specifically, a communication is initiated: if a maximum time period has elapsed since a prior communication (S500); if the content access log 114 no longer has enough available free memory space to log access to content data (S502); if a CI is not contained in the content descriptor table 116 (S504); if the subscriber requests a communication (S506); or if the set top box needs to register with the business service provider 160 or the CA provider 170, as in a newly installed set top box (S508). As shown in step S400, the CAM control device 118 initiates a secure communication to the business service provider 160.

Once a secure communication is initiated, the CAM control device 118 uploads the log contained in the content access log 114 to the business service provider 160 (S404). The CAM control device 118 then preferably receives an acknowledgment signal from the business service provider 160 (S406). The CAM control device 118 determines if the acknowledgment is valid (S408). If the acknowledgment is not valid, the protocol stops. If the acknowledgment is valid, the CAM control device 118 clears the content access log 114 (S410) to allow additional content which is accessed to be logged. After clearing the content access log 114, the CAM control device 118 initiates a secure communication with the CA provider 170 (S412), and downloads CDs, including keys required to decrypt the content data (S414). In this manner, the CAM control device 118 is able to learn new CDs to access new content, some of the CDs may only be accessible by contacting the CA provider.

The untrusted CAM control device 118 may also use the CI data in various way, such as to index into its own tables to determine the fee schedule for content. In that case, the CAM control device 118 runs a simplified billing system which can attempt to predict how much the subscriber is charged. But the results are guidance and not a guarantee since the true billing system preferably has global knowledge that may not be present locally. For example, the CAM control device 118 may not be aware that the subscriber has previously purchased unlimited rights to the content data from the business service provider 160.

The present invention lends itself to a market based relationship between the participants in broadcast transmission. In one scenario, the content provider 150 owns the content and the keys required to decrypt the content. In this scenario, the content provider 150 contracts with broadcasters to widely distribute the content, while conservatively using the broadcast spectrum, and with CA providers to securely distribute the keys. The content provider 150 may freely distribute the keys to the CA provider 170, or CA providers may pay a flat fee for these keys (based on their number of subscribers, for example), or may return to the content provider 150 a portion of the transaction revenue they charge subscribers for using those keys. Additionally, the keys themselves may be sold, leased or traded among several different CA providers, content providers, business service providers, broadcasters, or even subscribers through their subscription plans. In any case, the subscribers preferably only pay for access to the content or for a particular subscription plan, and not for access to the keys themselves.

The content providers preferably receive fees from CA providers based on the subscriber's behavior, such as by the particular content which is accessed. This revenue may be based directly on the subscriber's use of the content keys, or based on subscription packages that entitle the subscriber access to certain content packages. Furthermore, the business service provider 160 may bundle individual programs as packages so that different subscribers may purchase the packages. Alternatively, the business service provider 160 may allow individual subscribers to select individual programs which may be contained in a package. Accordingly, different subscribers may purchase the same program in different ways. Each CA provider 170 may also be penalized for compromised security, for example the number of counterfeit CA modules found to be used or sold based on a particular CA provider's design. This penalty provides incentive to the CA provider 170 to increase security, and also give new competitors to the market mechanism and incentive to lower their costs, by providing a more secure system. Properly balanced incentives will guide the market to the appropriate tradeoffs between security costs, fraud, revenue, and profit.

A principle advantage of the present invention is that CD distribution is separated from the content distribution. The CA provider 170 decides on the most efficient way to deliver CDs to the subscribers. For example, the CA provider 170 may purchase bandwidth from broadcasters and broadcast the CDs to their customers, or use a paging network. Alternatively, the CA provider 170 may deliver the CDs to individual subscribers over a phone line, via a modem or other communication device. This presents the CA provider 170 with great flexibility, it can deliver CDs to subscribers living between two broadcast regions even if their primary market is only in one of those regions, when it is not cost effective to broadcast to the other customers. Furthermore, since the CDs contain the single key needed to decrypt a particular piece of content, the CA provider 170 does not need to pay for broadcasting ECMs in that region.

Another principle advantage of the present invention is that it facilitates off-line operations. That is, the subscriber does not need to contact anyone to obtain access to the content to which the CAM 110 has CDs in the content descriptor table 118. Additionally, even if the CAM 110 does not contain the corresponding CD, the subscriber only needs to contact the CA provider 170 or the business provider 160 to obtain access, not the content provider 150 or the broadcaster 130.

Figure 6:
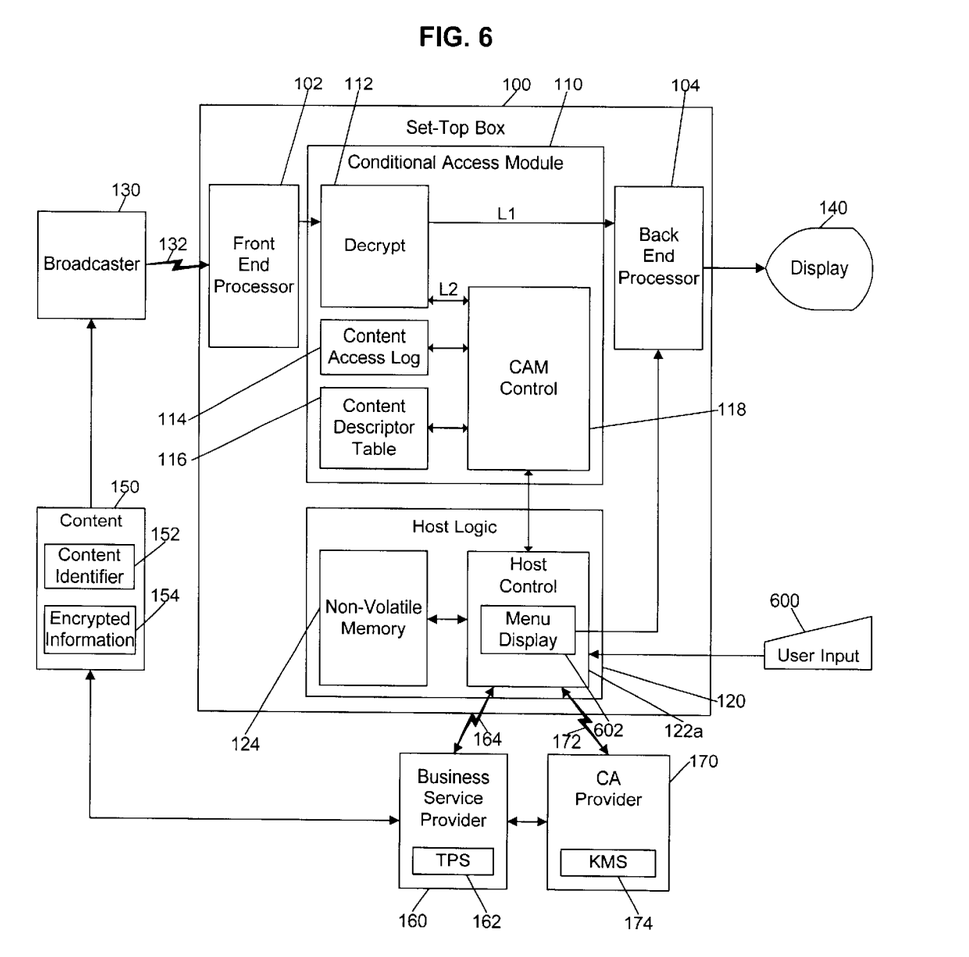
FIG. 6, illustrates another embodiment of the schematic diagram of the present invention.

In another embodiment, an example of which is illustrated in FIG. 6, the host control device 122a includes a menu display device 602. The menu display device 602 provides a menu display to the backend processor 104 which converts it to a form which can be displayed on display device 140. The host control device 122a receives subscriber input from an input device 600, which may control selection of content to be accessed and communication with the business service provider 160 and the CA provider 170. Preferably, the subscriber input is in the form of a selection of an item displayed in the menu generated by the menu display device 602. The items displayed on the menu may include a listing of programs available, i.e. being broadcast, and control functions of the set top box 100.

Figure 7:
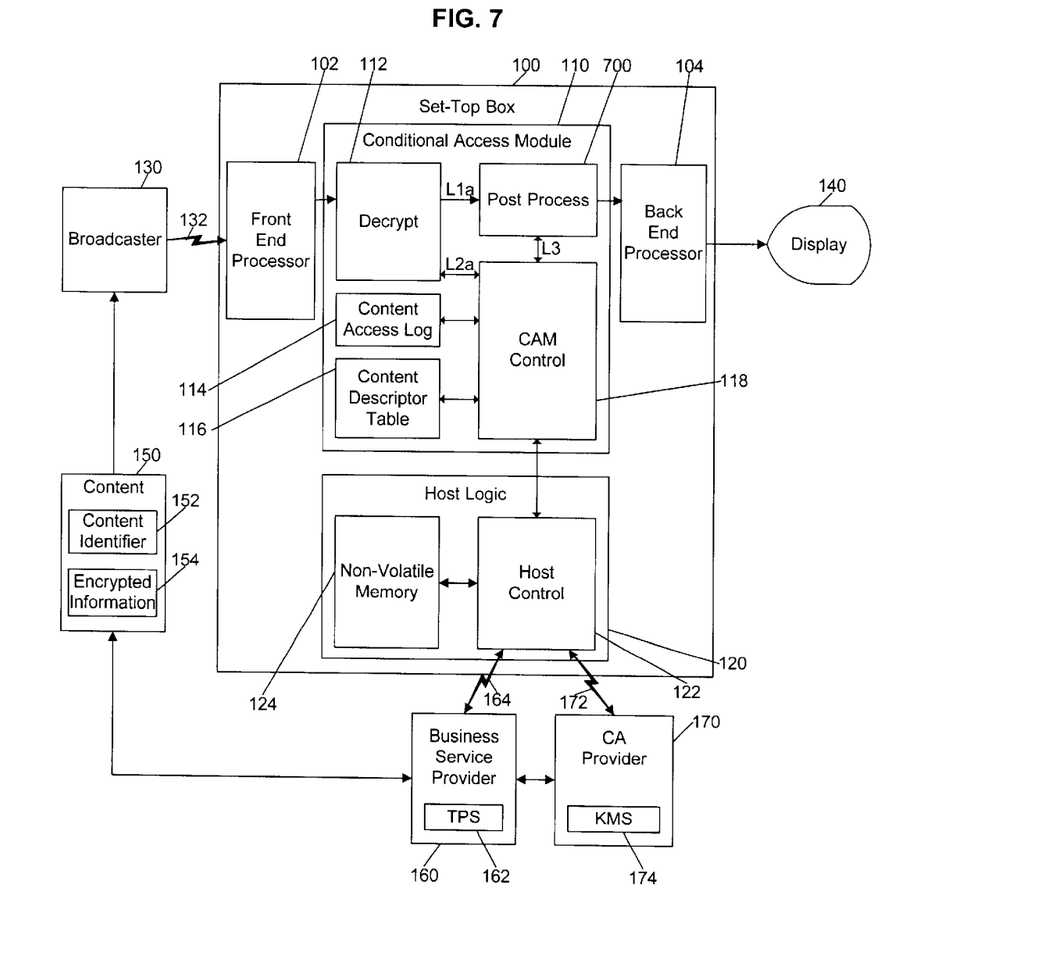
FIG. 7, illustrates yet another embodiment of the schematic diagram of the present invention.

In another embodiment, an example of which is depicted in FIG. 7, a post processing device 700 receives decrypted content on line L1a and manipulates the content data after it is decrypted by the decryption device 112 in order to reduce its value before passing it along to the subscriber, via the backend processor 104. The post processing device 700 receives post processing information, which instructs the post processing device how to manipulate the decrypted content, from the CAM control device 118 over signal line L3. The CAM control device 118 receives CI data over bi-directional signal line L2a. Such manipulation may include the addition of identifying data, such as watermarks, to the decrypted content data. This makes it possible to detect if a subscriber is redistributing the decrypted content data. The post processing may also provide interface protection to protect the content between the CAM 110 and the backend processor 104.

Figure 8A:
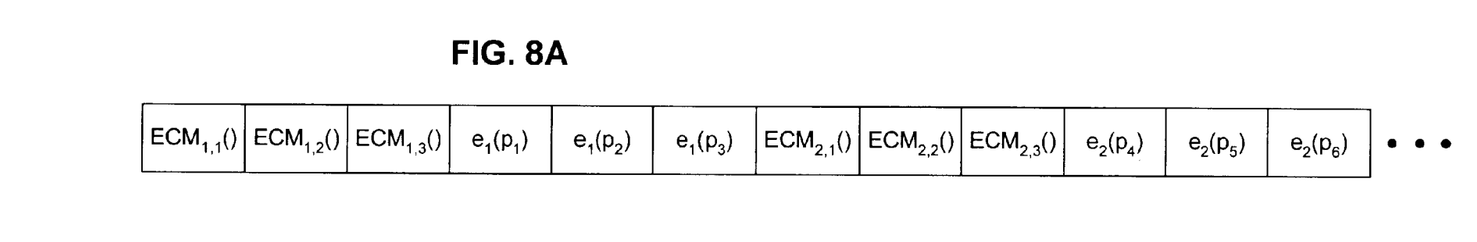
FIGS. 8A and 8B, illustrate yet another embodiment of the invention which uses indices to distribute the content information.

Another embodiment of the invention will now be described in connection with FIGS. 8A and 8B. FIG. 8A illustrates a known technique of broadcasting by interleaving ECMs with packets of content data. In order for the broadcaster to support more than one CA provider, using SIMULCRYPT, a different ECM would have to be provided for each content provider. Specifically, FIG. 8A illustrates a broadcast stream using SIMULCRYPT with three CA providers, each having their own ECMs interleaved within the content data. Furthermore, since each broadcaster interleaves a new ECM at frequency of every 3–20 seconds of broadcast, a long program of content has many ECMs. If these ECMs are required for the content decryption key, then a content descriptor table on a set top box 100 would need to be very large to store all of the ECMs. As a result, the content descriptor table 116 in a set top box 100 (eg., FIGS. 1, 6 or 7) would have to be very large to store the ECMs. This is too burdensome to be practical.

Figure 8B:
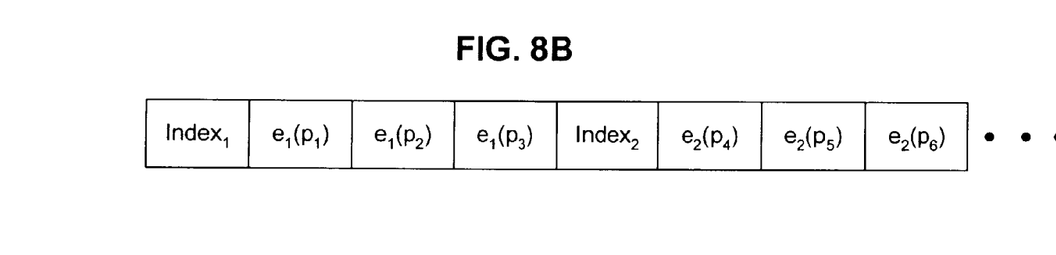

A solution to this problem is illustrated by FIG. 8B. Particularly, index data is interleaved with the content packets by each content provider. Each content provider preferably uses different index data, and the index data is interleaved at a frequency of every 3–20 seconds of broadcast. However, the index data itself is used by the CAM control device 118 (eg., FIGS. 1, 6 or 7) to determine the decryption key. Specifically, the CAM a control device 118 can compute the decryption key by using the hash of the index, i.e. decryption key=hash(index, key, index). This allows standardized decryption and encryption operations to be used by CAMs from different CA providers, since the hash computation enables each CAM control device to compute the new key from the content's key in the content descriptor and the current index. This allows a significant reduction in the memory space required on the set top box 100, allows a single subscriber to interact with a large number of content providers easily, and does not require cooperation between broadcasters.

Figure 9:
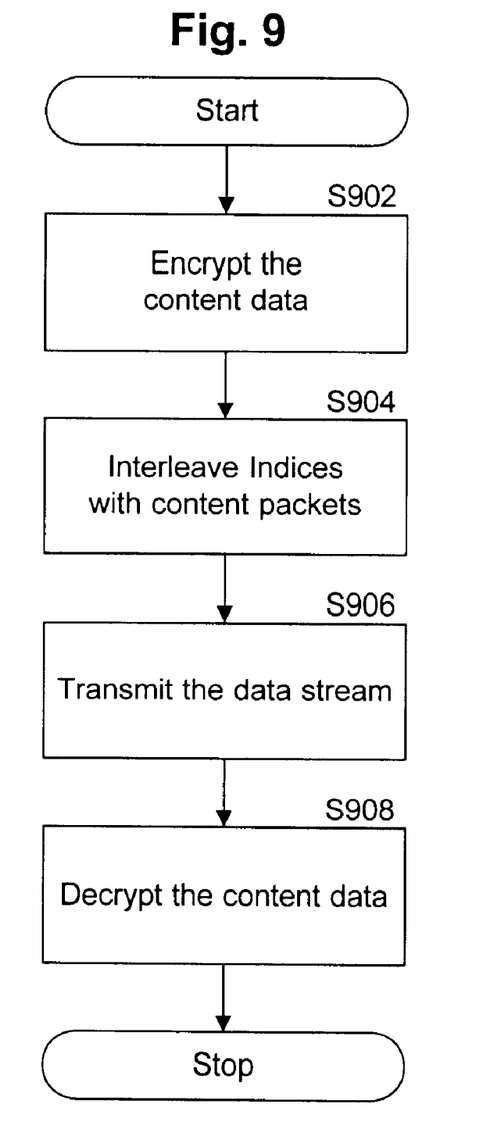
FIG. 9, illustrates a logical flow of the embodiment shown in FIG. 8B.

The operation of the embodiment of the invention illustrated in FIG. 8B is shown in FIG. 9. Particularly, the content data is encrypted using the hash function using a key value and an index value (S902), i.e. encryption key=hash(index, key, index). Then the index value is interleaved with associated content packets to form a data stream (S904). The data stream is then transmitted to the subscriber (S906). The subscriber decrypts the content data using the key value and the index value associated with the particular content packet using a hash function (S908), i.e. decryption key=hash (index, key, index). Furthermore, the data stream illustrated in FIG. 8B may be transmitted via a point to point broadcast, such as used by cellular phones, in which a specified subscriber receives a specified data stream. Alternatively, it may be transmitted in a multicast broadcast in which a large number of subscribers receive the same data stream.

The foregoing description of the preferred embodiments of the invention have been presented for purposes of illustration and description. It is not intended to be exhaustive or to limit the invention to the precise form disclosed, and obviously many modifications and variations are possible in light of the above teaching. It is intended that the scope of the invention be defined by the claims appended hereto.

We claim:

1. A method of distributing content data from a content provider device to a subscriber, the content provider device including an encryption device, the subscriber having a set top box including a decryption device, the method comprising the steps of:

encrypting content using the encryption device;

distributing the encrypted content from the content provider to the subscriber;

distributing keys, for decrypting the encrypted content, from the content provider to a service provider;

distributing the keys from the service provider to the subscriber; and accessing the content by decrypting the content using the decryption device, capable of decrypting content from several different content provider devices, wherein the keys are distributed to the subscriber temporally independent of the distribution of the content to the subscriber.

2. The method according to claim 1, further comprising the steps of:

logging access to the content by the subscriber in a log contained on a non-volatile memory; and sending the log to the service provider.

3. The method according to claim 2, wherein the step of distributing the keys further includes distributing rules with the keys, and wherein the steps of accessing the content and logging access of the content are performed according to the rules.

4. The method according to claim 2, further comprising the steps of:

generating a subscriber bill at the service provider based on the log; and computing royalties to be paid to the content provider.

5. The method according to claim 4, wherein the step of generating a subscriber bill comprises allocating charges based on access to an individual program.

6. The method according to claim 4, wherein the step of generating a subscriber bill comprises allocating charges based on access to a package of programs.

7. The method according to claim 1, further comprising the step of:

logging access to the content by the subscriber in a log contained on a non-volatile memory 2, wherein said step of accessing content is achieved without contacting the service provider.

8. The method according to claim 2, wherein the service provider includes a conditional access provider for distributing the keys, and a business service provider for receiving said log.

9. The method according to claim 2, further comprising the steps of:

receiving an acknowledgement signal from the service provider;

determining if the acknowledgement signal is valid; and clearing the log if the acknowledgement is determined to be valid.

10. The method according to claim 2, further comprising the steps of:

receiving an acknowledgement signal from the service provider;

determining if the acknowledgement signal is valid; and if valid, downloading keys from the service provider.

11. The method according to claim 1, wherein the step of distributing the keys comprises broadcasting said keys to the subscriber.

12. The method according to claim 1, wherein said step of distributing the encrypted content is performed by multiple content providers, and the step of distributing keys is performed by multiple service providers, and wherein said subscriber interacts with at least one of said multiple content providers and at least one of said multiple service providers.

13. The method according to claim 1, wherein the step of distributing the encrypted content further comprises the steps of:

distributing encrypted content from a single content provider to a plurality of broadcasters; and broadcasting the encrypted content to the subscriber.

14. The method according to claim 1, wherein the set top box further includes a display device and a menu navigation device, further comprising the steps of:

displaying a menu on said display device;

receiving input from said menu navigation device; and controlling access to content based on the received input.

15. The method according to claim 1, further comprising the step of:

processing the decrypted content to inhibit distribution of the decrypted content to more than one display device.

16. The method according to claim 1, further comprising the step of transmitting the content data through a secure point to point broadcast.

17. The method according to claim 1, further comprising the step of transmitting the content data through a multicast broadcast.

18. A method of distributing content data from a content provider to a subscriber, the subscriber having a set top box including a decryption device, the method comprising the steps of:

encrypting the content data using a content key and an index, in a series of indices, corresponding to a content packet, in a series of content packets;

forming a data stream by interleaving the series of indices with a series of content packets;

transmitting the data stream to the set top box; and decrypting the content packets using a content key and the index corresponding to the content packet in a series of indices using the decryption device, the decryption device capable of decrypting content from several different content provider devices, wherein the keys are distributed to the subscriber temporally independent of the distribution of the content packets to the subscriber.

19. The method according to claim 18, wherein the steps of encrypting and decrypting are performed by hashing the indices with the content key.

20. An apparatus for receiving and decrypting encrypted content data which is distributed from a content provider to a subscriber via a broadcaster, the apparatus comprising:

a receiver for receiving the encrypted content;

a decryptor for decrypting the encrypted content using a content descriptor distributed by a service provider, the decryptor device capable of decrypting content from several different content provider devices; and a controller for controlling the decryptor and for communicating with the service provider, thereby providing the subscriber access to the content data, wherein the content descriptor is distributed to the apparatus temporally independent of the distribution of the encrypted content.

21. The apparatus according to claim 20, further comprising a logging device for logging access to the content data, wherein the controller controls the logging of access to the content data by the logging device according to rules contained in the content descriptor.

22. The apparatus according to claim 20, further comprising a content descriptor table containing content descriptors from the service provider, wherein the controller determines whether a content descriptor in the content descriptor table corresponds to the received encrypted content.

23. The apparatus according to claim 20, further comprising a conversion device for converting the decrypted content data into a displayable form for display on a display device.

24. The apparatus according to claim 20, further comprising communication control logic, the communication control logic being responsive to the controller to communicate with the service provider.

25. The apparatus according to claim 20, further comprising:

a menu generator for generating a menu, having a plurality of operations, to be displayed on a display device; and a menu navigator for providing a user selection of said operations to said controller.

26. The apparatus according to claim 20, further comprising a processor for processing the decrypted content data to inhibit distribution of the decrypted content to more than one display device.

* * * * *